United States Patent
Kuwajima et al.

(10) Patent No.: US 7,046,485 B2
(45) Date of Patent: May 16, 2006

(54) PIEZOELECTRIC ACTUATOR, DISK DRIVE USING THE SAME AND MANUFACTURING METHOD THEREOF

(75) Inventors: Hideki Kuwajima, Kyoto (JP); Kaoru Matsuoka, Osaka (JP); Hirokazu Uchiyama, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 173 days.

(21) Appl. No.: 10/628,558

(22) Filed: Jul. 29, 2003

(65) Prior Publication Data

US 2004/0114279 A1    Jun. 17, 2004

(30) Foreign Application Priority Data

Jul. 29, 2002   (JP)   .............................. 2002-219346

(51) Int. Cl.
  *G11B 5/56*   (2006.01)

(52) U.S. Cl. .................................................. 360/292.4

(58) Field of Classification Search ............. 360/294.4
  See application file for complete search history.

(56) References Cited

U.S. PATENT DOCUMENTS

| | | |
|---|---|---|
| 6,501,625 B1 | 12/2002 | Boismier et al. |
| 2001/0021086 A1* | 9/2001 | Kuwajima et al. ....... 360/294.4 |
| 2001/0046107 A1* | 11/2001 | Irie et al. ................. 360/294.4 |
| 2002/0048124 A1* | 4/2002 | Kuwajima et al. ....... 360/294.4 |
| 2002/0080532 A1 | 6/2002 | Fujiwara et al. |

FOREIGN PATENT DOCUMENTS

| | | |
|---|---|---|
| JP | 10-136665 | 5/1998 |
| JP | P2001-332041 A | 11/2001 |

\* cited by examiner

*Primary Examiner*—A. J. Heinz
(74) *Attorney, Agent, or Firm*—McDermott Will & Emery LLP

(57) ABSTRACT

A piezoelectric actuator, the manufacturing method of the same and the head suspension assembly using the same are disclosed, wherein the piezoelectric actuator can be disposed easily without any breakage in mounting and can provide a magnetic head with fine displacements efficiently. More specifically, a first coupling portion and a second coupling portion are provided to couple the first piezoelectric element unit in parallel with the second piezoelectric element unit without being influenced each other by respective displacements. The configuration can provide a head suspension assembly with a high head positioning accuracy.

9 Claims, 21 Drawing Sheets

Fig.17
(a)
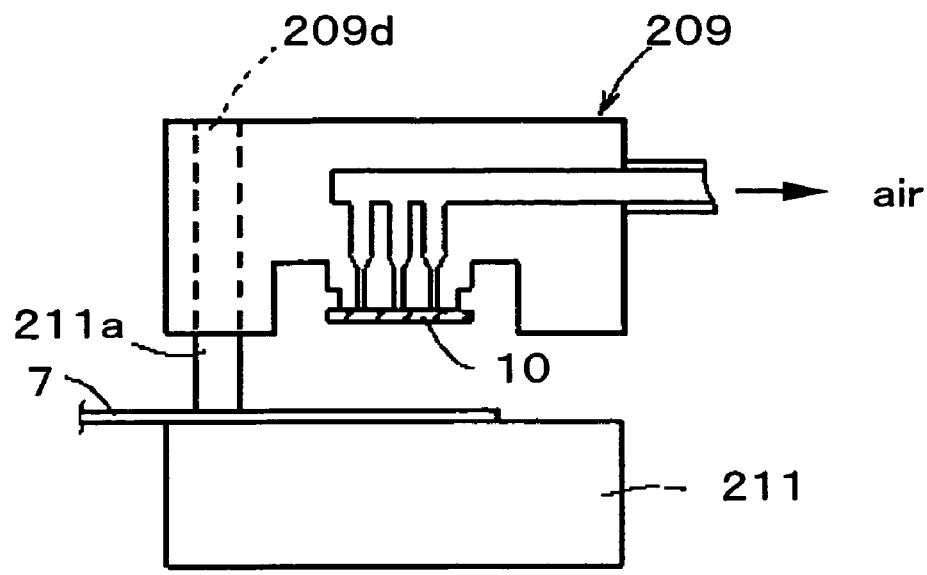
(b)
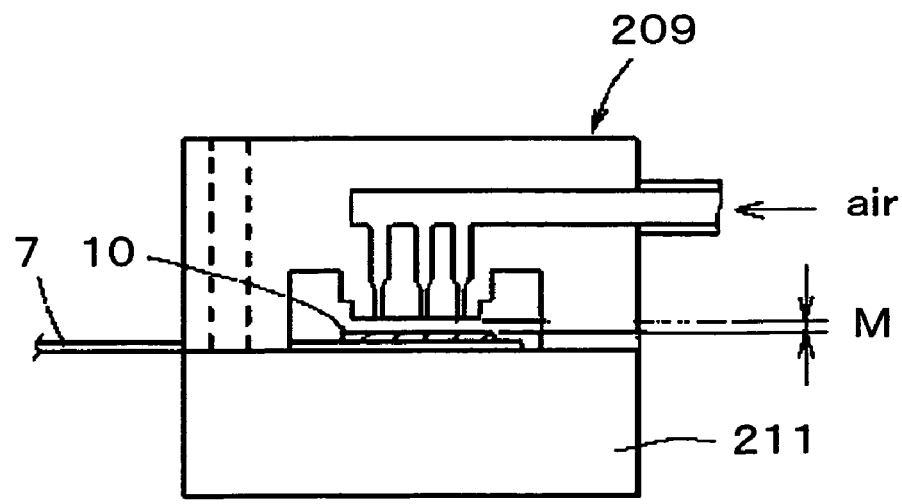

Fig.19
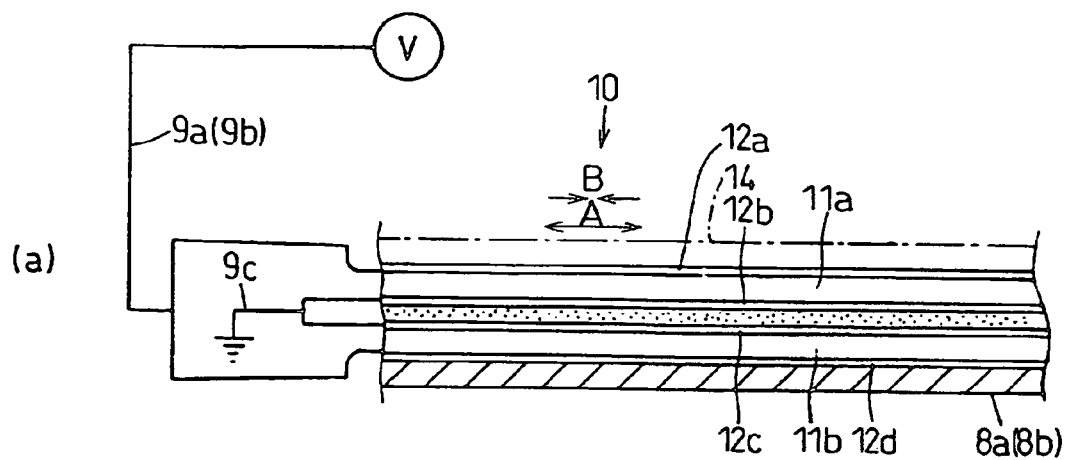
(a)
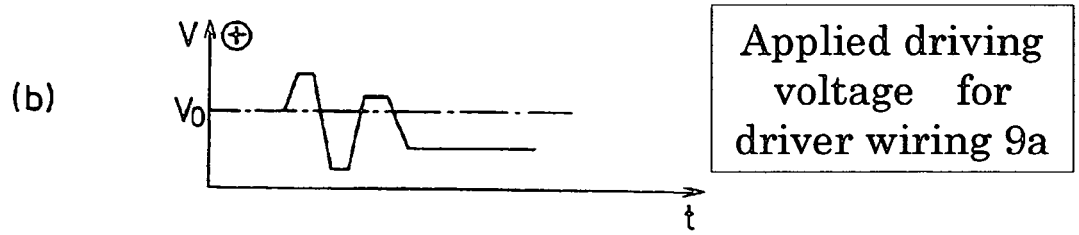
(b) Applied driving voltage for driver wiring 9a
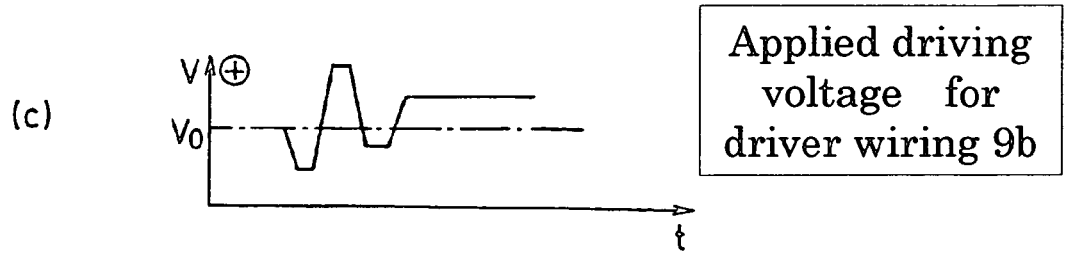
(c) Applied driving voltage for driver wiring 9b

PIEZOELECTRIC ACTUATOR, DISK DRIVE USING THE SAME AND MANUFACTURING METHOD THEREOF

FIELD OF THE INVENTION

The present invention relates to an actuator element made from a piezoelectric material characterized by a high elasticity upon applied electricity, and in particular to a piezoelectric actuator element for use in head positioning device in disk drive, the disk drive using the actuator and a manufacturing method for the piezoelectric actuator.

BACKGROUND ART

Recent technology regarding disk drive is making a rapid advance in linear track recording density due to improvements of the head devices. Along with this, a much finer track pitch is required for a larger recording density in normal direction to the tracks. A mechanism capable of driving the head with a finer scale is needed to follow the narrow track width precisely with a magnetic head.

Now, a hard magnetic disk drive is described, which has a larger storage capacity due to improved recording density among other disk drives, and has an enlarged application fields other than personal computers (PC). FIG. 21 shows a plan view of head suspension assembly 200 used in a typical hard magnetic disk drive. In FIG. 21, slider 102 having a magnetic head for recording data to or reproducing data from rotating magnetic disk 150 is mounted on distal end of load beam 104 (or suspension arm). Another end of load beam 104 is mounted to carriage 106 pivotally around projection 108 as a center of rotation within minute angles. Carriage (or actuator arm) 106 is pivotally mounted to shaft 110 fixed on a housing (not shown) of hard magnetic disk drive.

Voice coil 114, a part of magnetic circuit 112, is firmly mounted on the housing. Upon applying exciting current to voice coil 114, a magnetic force generated against a permanent magnet (not shown) mounted on carriage 106 moves carriage 106 pivotally. Carriage 106 moves pivotally relative to a controlled exciting current to voice coil 114 to transport slider 102 equipped with a head radially to a target location on a disk.

A pair of piezoelectric elements 116 are provided between carriage 106 (or actuator arm) and load beam 104 (or suspension arm). The piezoelectric elements 116 are disposed on carriage 106 symmetrically each other at a small amount of angles longitudinally as shown in FIG. 21.

Extension and contraction movements exerted by respective actuator elements 116, indicated by arrows A14 in FIG. 21, can displace slider 102 mounted at the distal end of load beam 104 slightly to position on the target location of the surface of magnetic disk 150 precisely.

In aforementioned head suspension assembly 200, piezoelectric elements 116 are placed between members provided on load beam 104 and carriage 106 respectively, and are pressed to touch load beam 104 and carriage 106 respectively in their side surfaces. Consequently, extension and contraction movement exerted by respective actuator elements 116 moves load beam pivotally to give slider 102 a slight displacement.

However, in a typical head suspension assembly as shown in FIG. 21, the problem is that respective actuator elements must be mounted individually, which not only needs additional assembling processes but not free from risks of breakage for piezoelectric elements in the assembling processes.

SUMMARY OF THE INVENTION

The invention disclosed aims at to provide a piezoelectric actuator capable of reducing risks of breakage in setting, of assembling easily and slightly moving the head efficiently, to provide a manufacturing method and a disk drive equipped with the head suspension assembly using the piezoelectric actuator.

Specifically, a piezoelectric actuator disclosed in this invention comprises a first piezoelectric element unit, a second piezoelectric element unit and coupling portions to fulfill the purpose, wherein the first piezoelectric element unit and the second piezoelectric element unit are placed approximately in parallel with each other to form a configuration such that the first piezoelectric element unit and the second piezoelectric element unit are coupled by the coupling portions. Additionally, the piezoelectric actuator disclosed in this invention can also have following configurations that: (a) material of the coupling portion is partially removed to form a slit; (b) the first piezoelectric element unit and the second piezoelectric element unit are coupled by the coupling portions at least on near one end and on an opposite side across the slit; (c) the coupling portions are formed from a protective layer identical to a coating substance to protect the first piezoelectric element unit and the second piezoelectric element unit; (d) the protective layer is composed of a resinous material; (e) the first piezoelectric element unit and the second piezoelectric element unit are formed of thin film respectively; (f) moreover, an adhesive layer is sandwiched between two piezoelectric element bodies to form a multilayered structure, wherein the piezoelectric element body is composed of the first thin film piezoelectric element and the second thin film piezoelectric element covered with a metal layer respectively; (g) the adhesion layer is composed of a resinous adhesive; (h) the adhesion layer is a weldbonding layer formed from thin metal films of both electrodes welded and bonded together.

The configuration enables to mount both piezoelectric actuators of the head suspension assembly in an incorporated form, having little influence each other on displacements of the piezoelectric actuators though both are incorporated. Both actuators can be incorporated reliably with minimum amount of coupling portions composed of a soft material, different from piezoelectric materials, which can be more difficult to hamper the displacement properties.

The disk drive disclosed in the present invention comprises: (a) a disk; (b) a disk driving mechanism to rotate the disk; (c) a slider carrying head for recording and/or reproduction of data the disk; (d) a load beam to mount the slider on its distal end; (e) a carriage:
    securing load beam rotatably on the disk side,
    mounted pivotally on a shaft fixed to the housing,
    to move pivotally by a driving means mounted opposite to the disk, and
    to move a slider radially to a target location on the disk;

(f) a head actuator provided between the carriage and a disk side end of suspension arm, wherein the head actuator comprises the first piezoelectric element unit, the second piezoelectric element unit and coupling portions, to form a configuration such that the first piezoelectric element unit and the second piezoelectric element unit arranged approximately in parallel with each other are coupled by the coupling portions. Moreover the disk drive disclosed in the present invention is provided with a piezoelectric actuator having a structure such that the coupling portion has a slit, and that the first piezoelectric element unit and the second piezoelectric element unit are coupled by the coupling portions at least near one end and on an opposite side across the slit.

The configuration enables the mounting of both piezoelectric actuators on the head suspension assembly in an incorporated form, and provides an excellent disk drive having a property that the piezoelectric actuators minimally influence each other with regard to displacements of the piezoelectric actuators though both are incorporated.

The manufacturing method of the piezoelectric actuators disclosed in the present invention comprises the steps of:

(a) forming a first electrode metal layer, a first thin film piezoelectric element and a second electrode metal layer on a first substrate sequentially;

(b) forming a third electrode metal layer, a second thin film piezoelectric element and a fourth electrode metal layer on a second substrate sequentially;

(c) bonding the second electrode metal layer to the third electrode metal layer;

(d) removing the first substrate;

(e) forming the first thin film piezoelectric element and the second thin film piezoelectric element both having a two-layer structure into a prescribed shape by a dry-etching method;

(f) covering the first thin film piezoelectric element and the second thin film piezoelectric element both having been dry-etched with a coating resin;

(g) patterning the coating resin with a slit having a prescribed shape; and (h) removing the second substrate.

In another configuration, the first substrate and the second substrate are formed from a single crystal material.

Moreover, the patterning process of coating resin in the manufacturing method of the piezoelectric actuators disclosed in the present invention includes processes to form a slit and coupling portions of the first thin film piezoelectric element unit and the second thin film piezoelectric element unit coupled at least in one end and in an opposite side across the slit.

The configuration can provide a manufacturing method with easy assembling processes and little reject ratio, because both thin film piezoelectric element units are coupled in minimum number of coupling portions to mount reliably on the head suspension assembly in an incorporated form, and have little influence on displacements of each thin film piezoelectric element unit though both are incorporated.

BRIEF DESCRIPTION OF THE DRAWINGS

FIGS. 17(a) to (b) are schematic representations of a stacking process of a second positioning base on a first positioning base to position a piezoelectric actuator element provided in a head suspension assembly in accordance with an exemplary embodiment of the present invention.

FIGS. 19(a) to (c) are cross-sectional views of a piezoelectric actuator element and schematic representations of specific voltage applied on a piezoelectric actuator element to describe movements of the head suspension assembly in accordance with an exemplary embodiment of the present invention.

DETAILED DESCRIPTION OF THE INVENTION

Now, a piezoelectric actuator disclosed in the present invention, associated with a structure of a head suspension assembly provided with the piezoelectric actuator, methods and jigs to manufacture the piezoelectric actuator are described in detail with reference to the drawings.

EXEMPLARY EMBODIMENT

Figure 1:
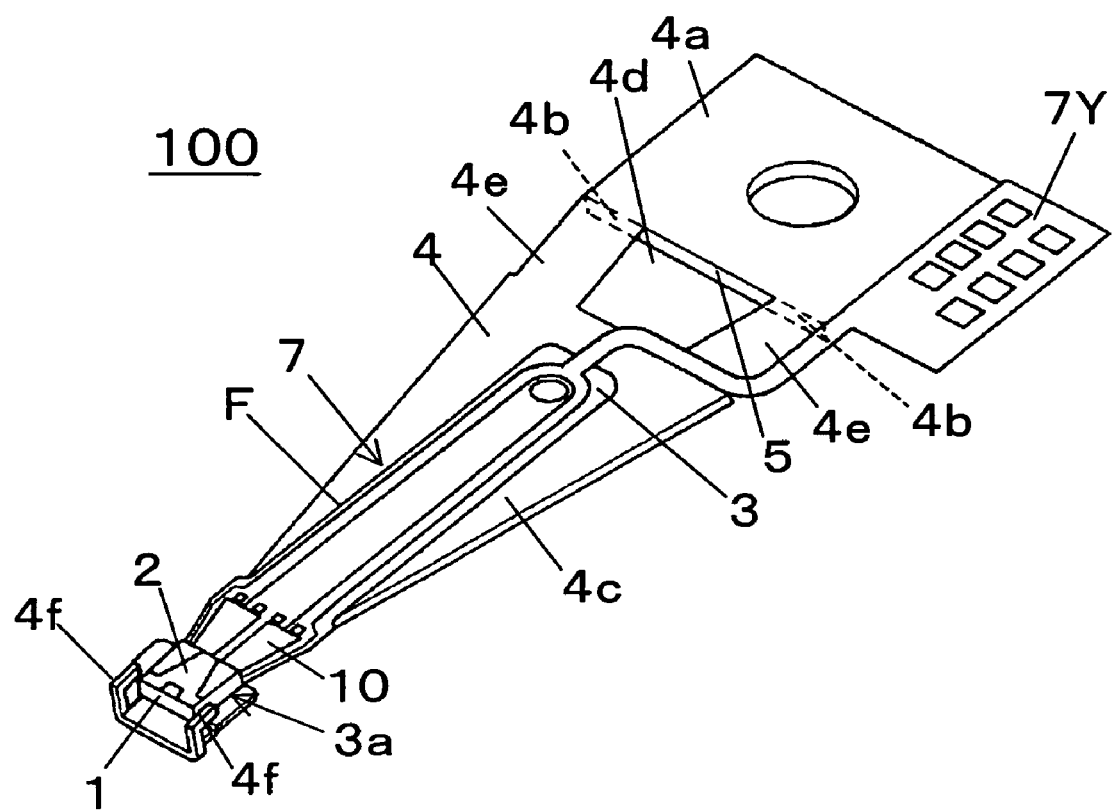
FIG. 1 is a perspective view of a head suspension assembly in accordance with an exemplary embodiment of the present invention.
Figure 2:
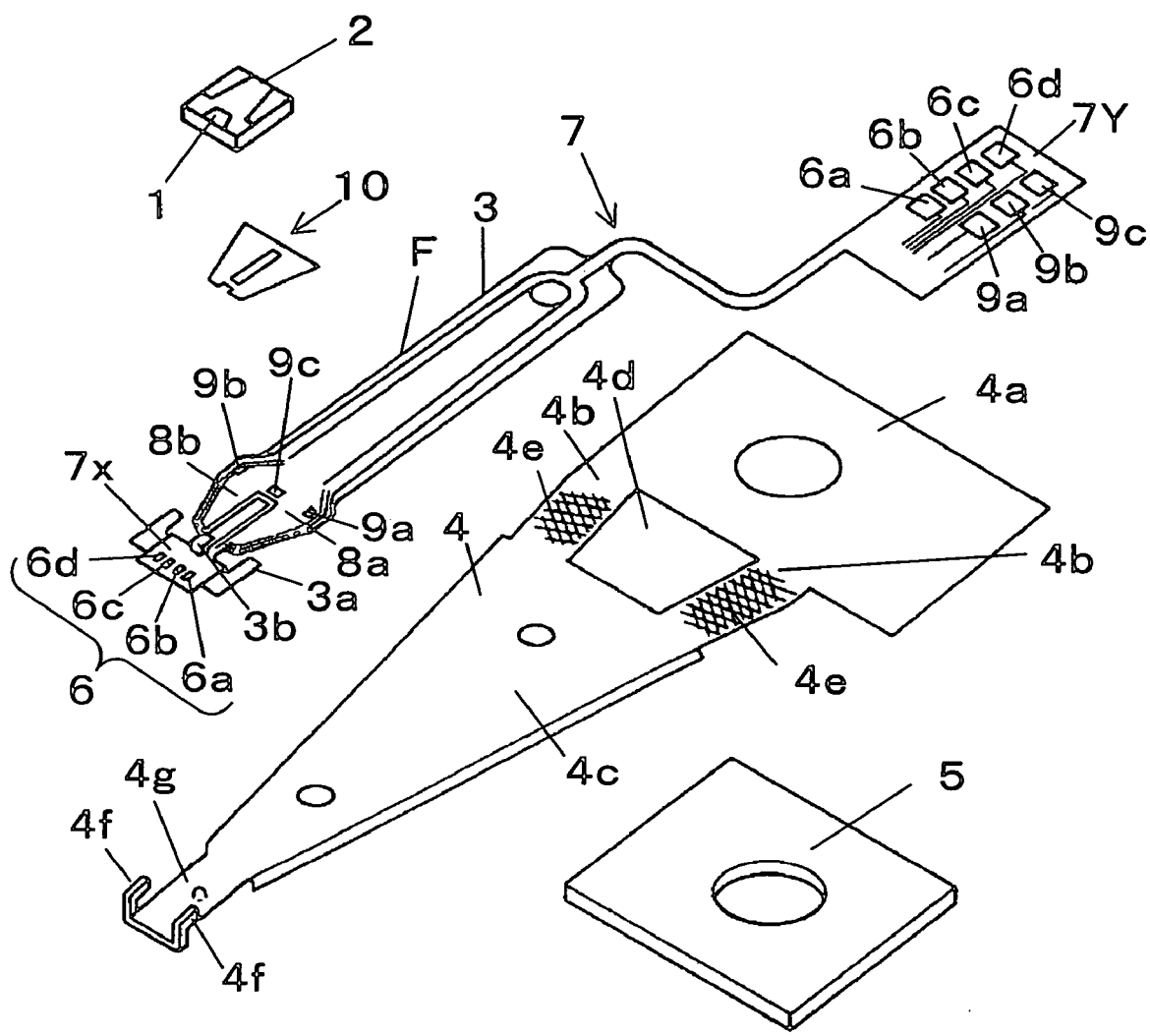
FIG. 2 is an exploded perspective view of a head suspension assembly in accordance with an exemplary embodiment of the present invention.

FIG. 1 shows a perspective view of a head suspension assembly provided with a piezoelectric actuator in accordance with the exemplary embodiment of the present invention. FIG. 2 shows an exploded perspective view of the head suspension assembly and FIG. 3 shows a perspective view of a slider used in the head suspension assembly.

Figure 3:
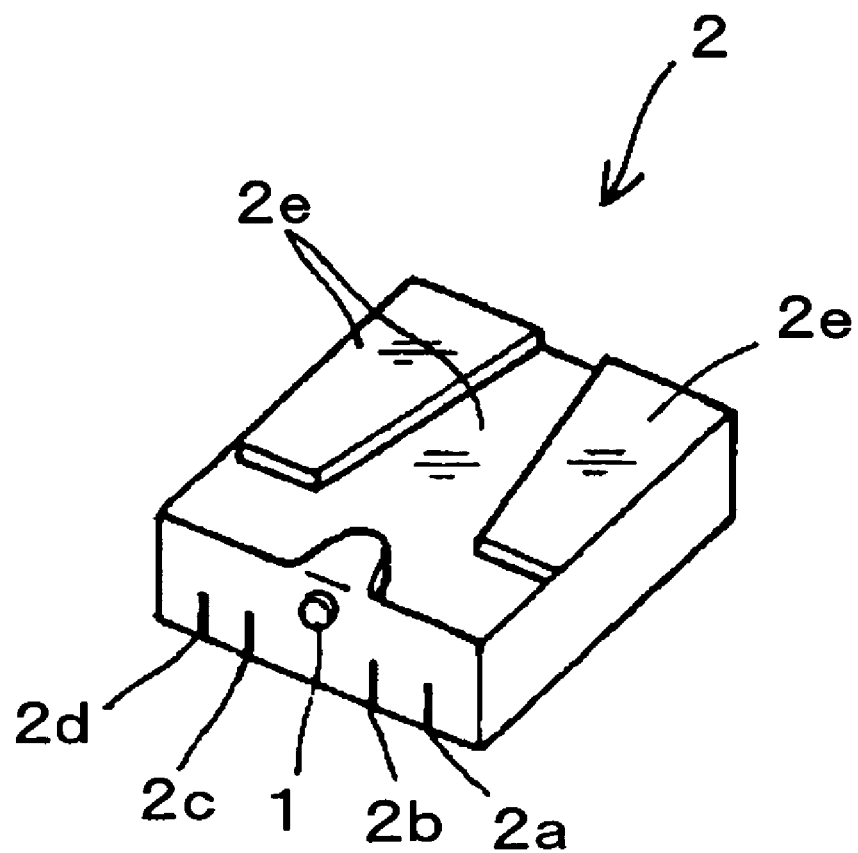
FIG. 3 is a perspective view of a slider used in a head suspension assembly in accordance with an exemplary embodiment of the present invention.

Head suspension assembly 100 has load beam 4 (or suspension arm) having slider 2, provided with magnetic head 1 as an example of head element, on its distal end as shown in FIGS. 1 to 3. Load beam 4 has a squire shaped mounting portion 4a attached to a head actuator arm (not shown), and mounting portion 4a is fixed to base plate 5 by beam welding or the like. Base plate 5 is mounted to the aforementioned head actuator arm. Load beam 4 elongates from mounting portion 4a to gradually narrow shaped neck portion 4b, and is followed by straight shaped beam 4c sequentially.

Opening 4d is provided in the center of neck portion 4b to form plate spring 4e. Rim 4f is provided on each side at the distal end of beam 4c to limit the pivotal motion of slider holder 3a above a small gap.

Each rim 4f elongates straightly from the distal end of beam 4c to the direction of mounting portion 4a. Flexure 7 having patterned wiring 6 is provided on beam 4c. Basic material of flexure 7 is stainless steal. Slider 2 equipped with magnetic head 1 is mounted on slider setting portion 7x provided on one end of flexure 7. Four terminals 2a to 2d are disposed in parallel at the bottom of slider surface provided with magnetic head 1 (see FIG. 3). Moreover, air-bearing surface 2e is designed on the top surface of slider 2 to form a bearing of air above the disk surface by air flowing generated in rotation of disk (not shown) in the pitch direction (tangential direction of the disk). Central point of air-bearing surface 2e corresponds to projection 4g of load beam 4 (or suspension arm).

Figure 4:
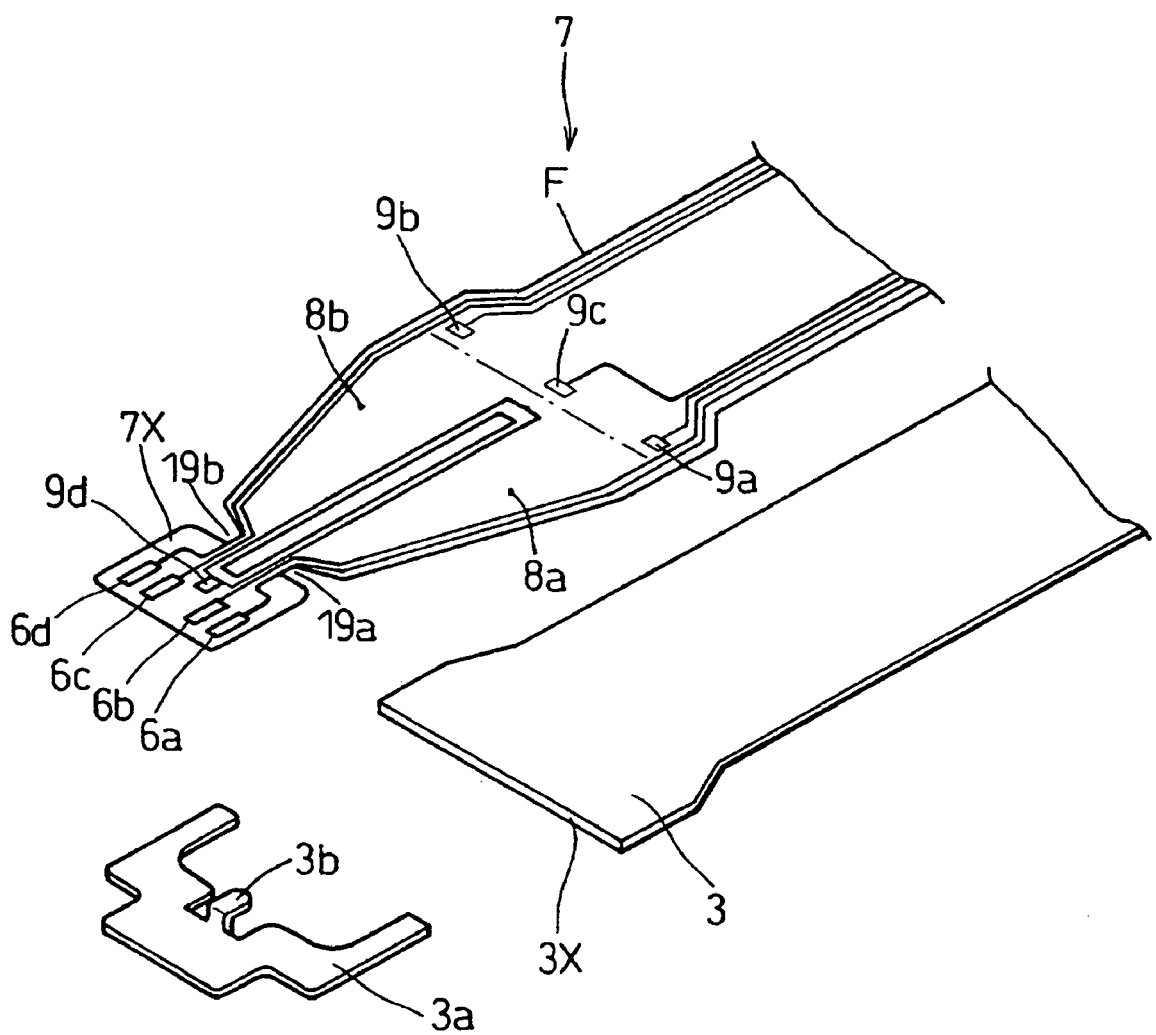
FIG. 4 is an exploded perspective view showing a configuration of a flexure used in a head suspension assembly in accordance with an exemplary embodiment of the present invention.

FIG. 4 is an exploded perspective view showing a configuration of an end portion of flexure 7 used in head suspension assembly 100.

Flexure 7 consists of flexure substrate 3, that forms flexure body, and slider holder 3a provided at one end of flexure 7 as shown in FIG. 4. Flexure substrate 3 and slider holder 3a are made of for instance, but not limited to, stainless steel or the like, and slider holder 3a is disposed coplanar flexure substrate 3 at an end of flexure substrate 3 (or an end of flexure 7). Flexible substrate F composed of for instance, but not limited to, polyimide resin or the like is provided between flexure substrate 3 and slider holder 3a to couple these flexure substrate 3 and slider holder 3a mechanically. Additionally, flexible substrate F has elastic hinge portions 19a and 19b having partial narrow width. Hinge portions 19a and 19b are provided at the edge of flexure substrate 3 and slider holder 3a to couple both materials movably. Electrical wirings 6a, 6b, 6c and 6d are provided on the top surface of flexible substrate F. In addition to this, thin film portions 8a and 8b are disposed on the top surface of flexible substrate F in parallel with each other. (Thin film portions 8a and 8b mean "locations" or "places" on which the piezoelectric actuator 10 is disposed.) Thin film portions 8a and 8b are disposed at a distal end of flexure substrate 3. Thin film element portions 8a and 8b are formed suitable to be put on piezoelectric actuator element 10 as described latter. Outline of slider holder 3a and flexure substrate 3 are shaped at the same time by etching processing.

Projection 3b formed on slider holder 3a is pressed to touch boss 4g provided near the top end of load beam 4 (or suspension arm). Because projection 3b is pressed to touch boss 4g, slider holder 3a is held pivotally around boss 4g as a center of rotation in all directions.

Terminal holder 7y is provided on another end of flexure 7. Terminal holder 7y is placed on a side of mounting portion 4a of load beam 4.

Figure 5:
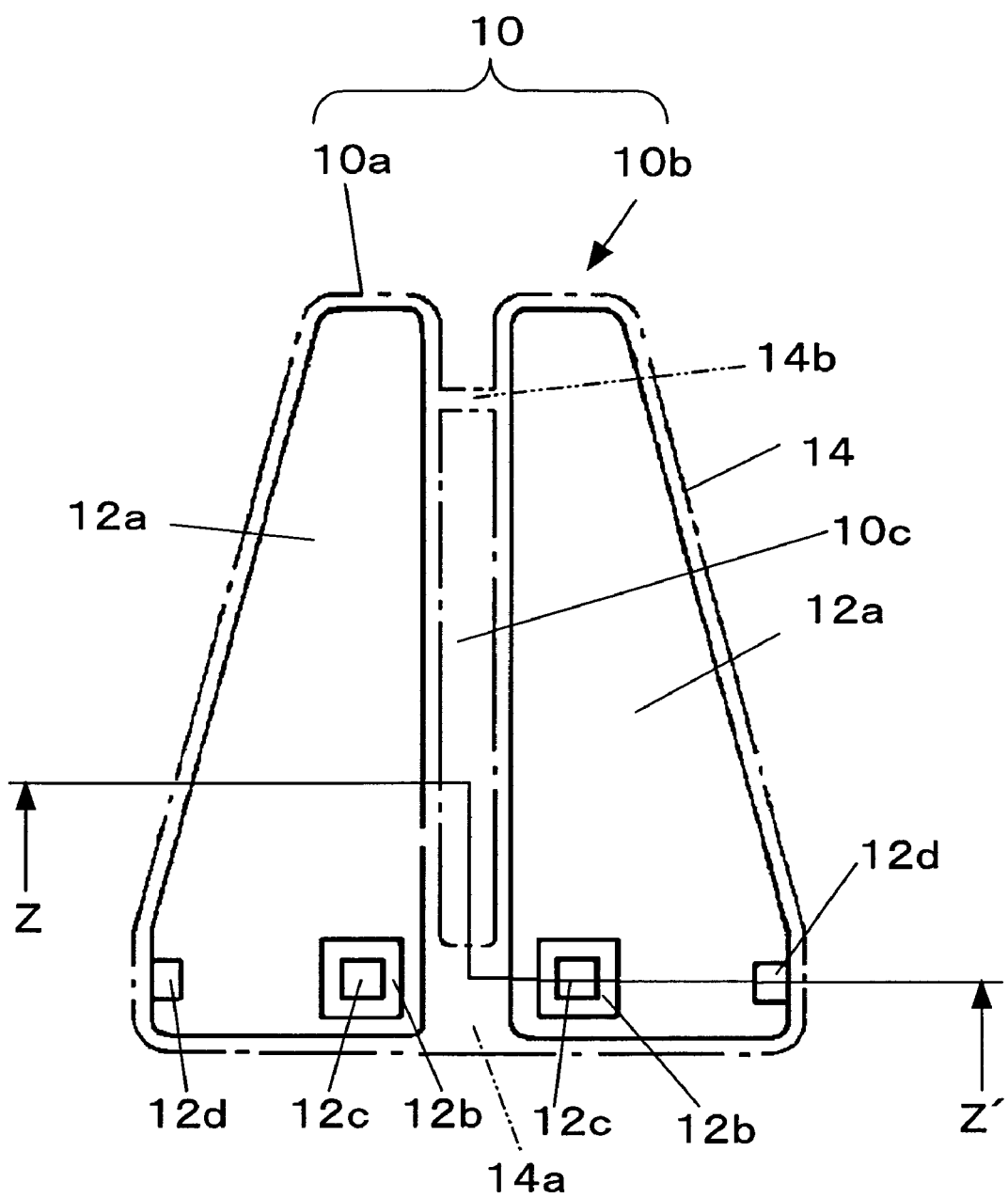
FIG. 5 is a plan view of piezoelectric actuator elements provided in a head suspension assembly in accordance with an exemplary embodiment of the present invention.

Next, piezoelectric actuator element 10 made from a thin film element used in the exemplary embodiment of the present invention is described. FIG. 5 is a plan view of piezoelectric actuator elements 10 provided in a head suspension assembly 100, wherein piezoelectric actuator elements 10 are put on thin film element portions 8a and 8b provided at the end of load beam 4 where slider 2 is mounted. Thin film piezoelectric actuator element 10 consists of first piezoelectric element unit 10a and second piezoelectric element unit 10b, both are formed from thin film piezoelectric element, and thin film piezoelectric actuator element 10 is covered entirely using flexible a coating resin 14, such as, but not limited to polyimide resin. These first piezoelectric element unit 10a and second piezoelectric element unit 10b are coupled in two portions, first coupling portion 14a and second coupling portion 14b near the top end, both portions share coating resin 14. Additionally, slit 10c is formed between first piezoelectric element unit 10a and second piezoelectric element unit 10b.

Figure 6:
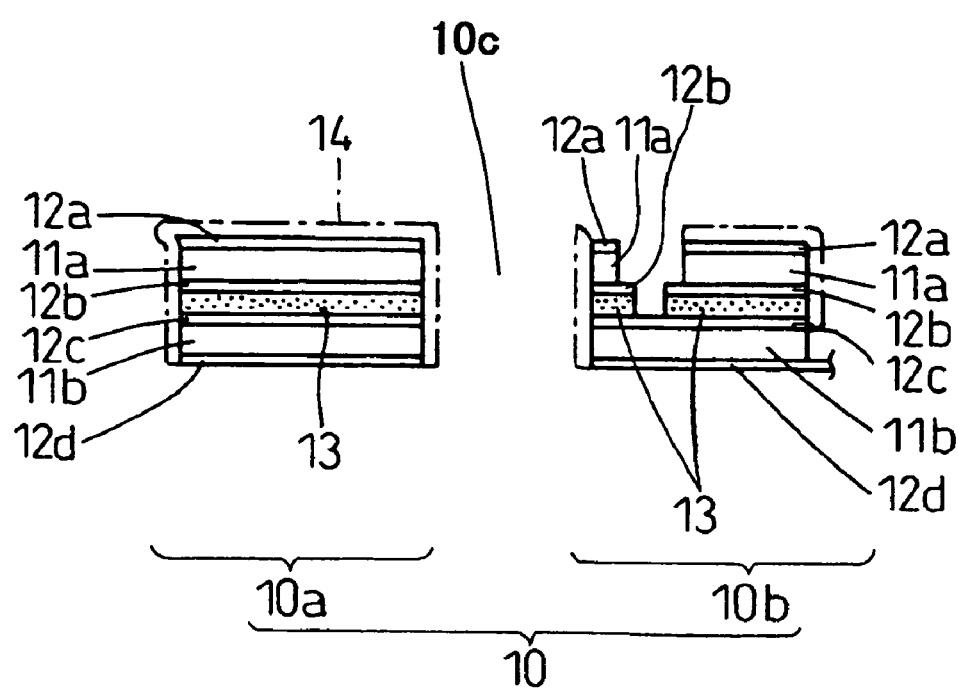
FIG. 6 is a cross-sectional view of piezoelectric actuator elements provided in a head suspension assembly in accordance with an exemplary embodiment of the present invention.

FIG. 6 is a cross-sectional view taken along the line Z–Z' in FIG. 5. Piezoelectric actuator element 10 shown in FIGS. 5 and 6 is bonded to mount on thin film element portions 8a and 8b. (see FIG. 4). A pre-coating for instance using chromium or the like with the order of sub-micron in thickness is applied on thin film element portions 8a and 8b to provide a better adhesion with piezoelectric actuator element 10.

Additionally, as shown in the cross-sectional view in FIG. 6, piezoelectric actuator element 10 has a pair of first piezoelectric element unit 10a and second piezoelectric element unit 10b provided separately on either right and left side. Both of first piezoelectric element unit 10a and second piezoelectric element unit 10b have a double layer structure that consists of first thin film piezoelectric element 11a and second thin film piezoelectric element 11b being multilayered. First electrode metal layer 12a and second electrode metal layer 12b are formed on respective top and bottom sides of first thin film piezoelectric element 11a, viewed upper side in the drawing. Similarly, third electrode metal layer 12c and forth electrode metal layer 12d are formed on respective both sides of second thin film piezoelectric element 11b, disposed below first thin film piezoelectric element 11a. Second electrode metal layer 12b and third electrode metal layer 12c are bonded with adhesive 13.

Figure 7:
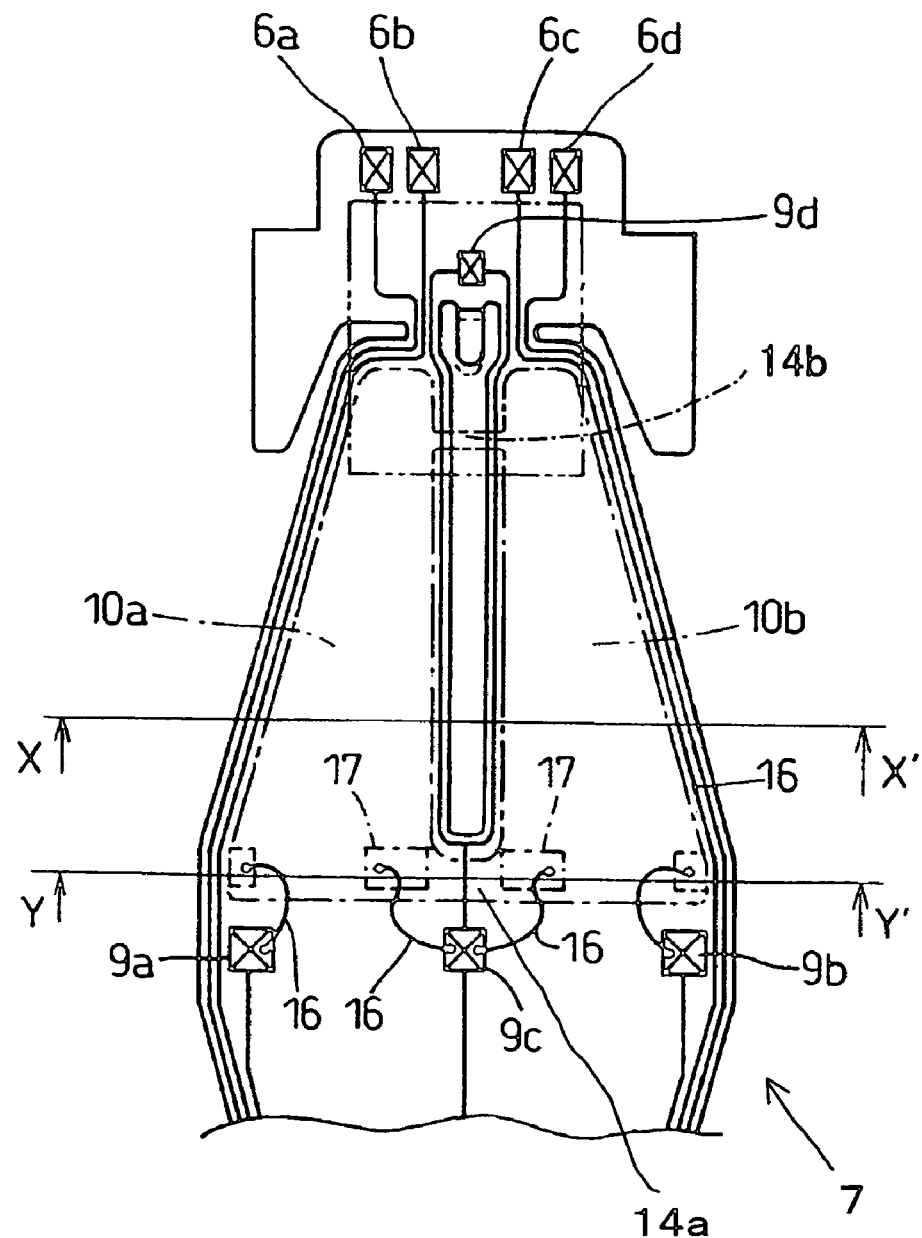
FIG. 7 is a plan view of a flexure used in a head suspension assembly in accordance with an exemplary embodiment of the present invention.
Figure 8:
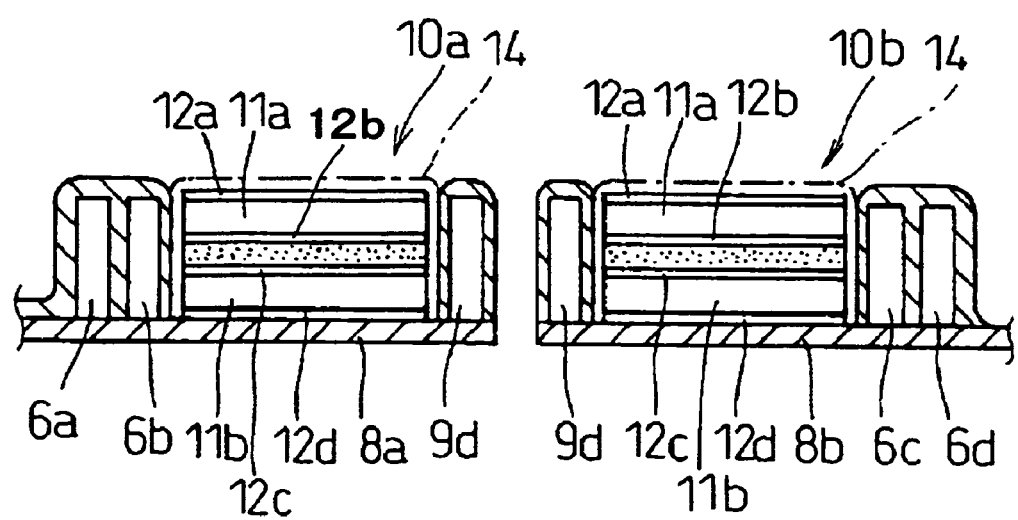
FIG. 8 is a sectional view taken along the line X–X' of a flexure used in a head suspension assembly in accordance with an exemplary embodiment of the present invention.
Figure 9:
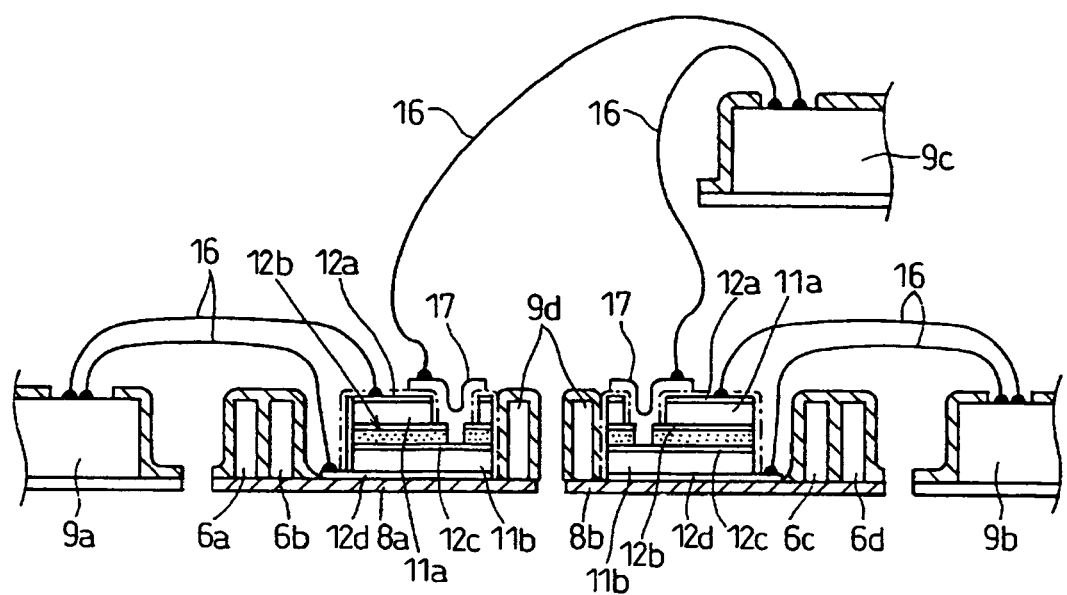
FIG. 9 is a sectional view taken along the line Y–Y' of a flexure used in a head suspension assembly in accordance with an exemplary embodiment of the present invention.

FIG. 7 shows a plan view around flexure 7 of head suspension assembly 100, wherein flexure 7 is provided with piezoelectric actuator element 10 in accordance with the exemplary embodiment of the present invention. That is, FIG. 7 shows a plan view of flexure 7 provided with piezoelectric actuator element 10 viewed from the side of slider 2 (not shown) to be bonded. FIG. 8 is a cross-sectional view taken along the line X–X' of the flexure shown in FIG. 7 (pasted with piezoelectric actuator element 10). FIG. 9 is a cross-sectional view taken along the line Y–Y'in FIG. 7. Electrical wirings 6a, 6b, 6c, 6d and grounded wiring of slider 2 (not shown) are placed coplanar to piezoelectric actuator element 10 as shown in FIGS. 7 to 9.

Next, electrical wirings of piezoelectric actuator element 10 used in the exemplary embodiment of the present invention are described. In FIG. 9, first electrode metal layer 12a and fourth electrode metal layer 12d of piezoelectric actuator element 10 are charged positively, while second electrode metal layer 12b and third electrode metal layer 12c are grounded.

First electrode metal layer 12a and fourth electrode metal layer 12d are connected to thin film piezoelectric element driver wirings 9a and 9b through bonding wire 16. Second electrode metal layer 12b and third electrode metal layer 12c are connected to thin film piezoelectric element driver wiring 9c through grounded metal layer 17. Grounded wiring 9d of slider 2, or a grounded terminal of slider 2, is shorted to thin film piezoelectric element driver wiring 9c. Other ends of these thin film piezoelectric element driver wirings 9a, 9b and 9c are connected to an external control circuit (not shown) through terminals mounted on terminal holder 7y.

Figure 10:
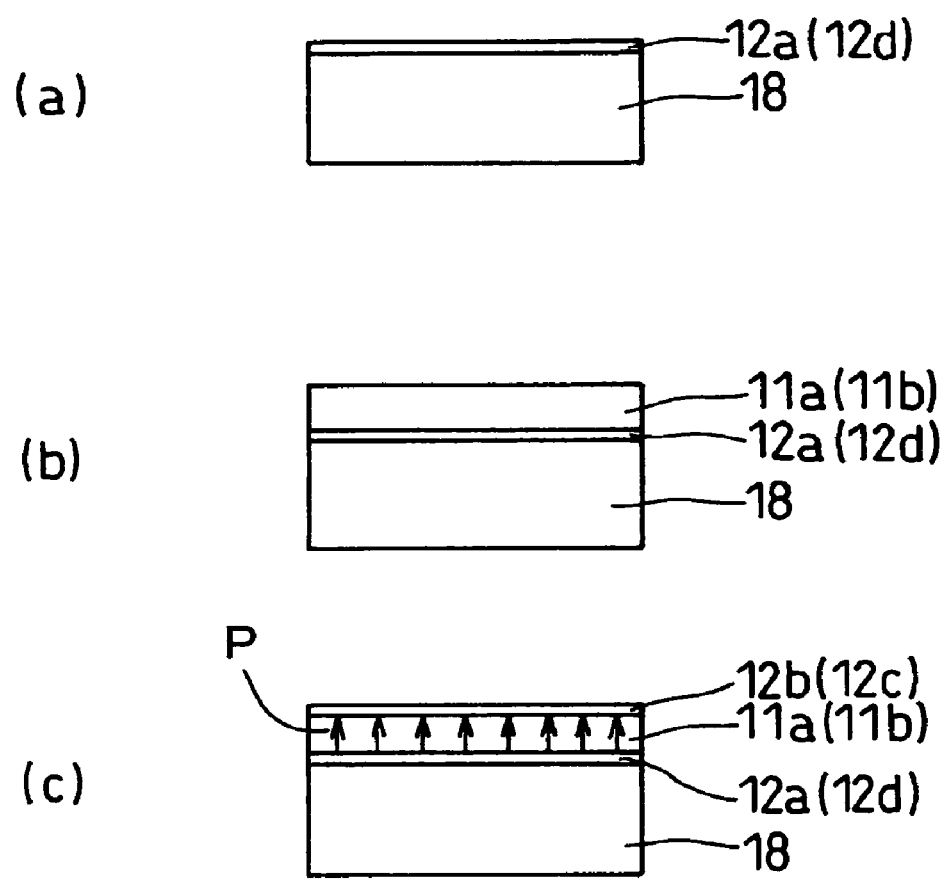
FIGS. 10(a) to (c) are enlarged cross-sectional schematic views showing procedures for forming piezoelectric actuator elements and their attached electrodes provided in a head suspension assembly in accordance with an exemplary embodiment of the present invention.

Next, procedures for forming the piezoelectric actuator element 10 are described briefly. The procedures for forming piezoelectric actuator element 10 and its constituent elements, first electrode metal layer 12a to fourth electrode metal layer 12d, on MgO single crystal substrate 18 are shown in FIG. 10 using an exploded cross-sectional view of piezoelectric actuator element 10. Firstly, first electrode metal layer 12a (fourth electrode metal layer 12d) is formed on MgO single crystal substrate 18 as shown in FIG. 10(a). Secondly, first thin film piezoelectric element 11a (second thin film piezoelectric element 11b) composed of PZT (lead zirconate titanate, $Pb(Zr_xTi_{1-x})O_3$) or the like are allowed for single crystal growth on first electrode metal layer 12a (fourth electrode metal layer 12d) by sputter deposition method, MBE method or the like as shown in FIG. 10(b). Moreover, second electrode metal layer 12b (third electrode metal layer 12c) is formed on the top surface of first thin film piezoelectric element 11a (second thin film piezoelectric element 11b) as shown in FIG. 10(c). Initial polarization of first thin film piezoelectric element 11a directs C-axis of the crystal as shown by arrow P in FIG. 10(c).

Figure 11:
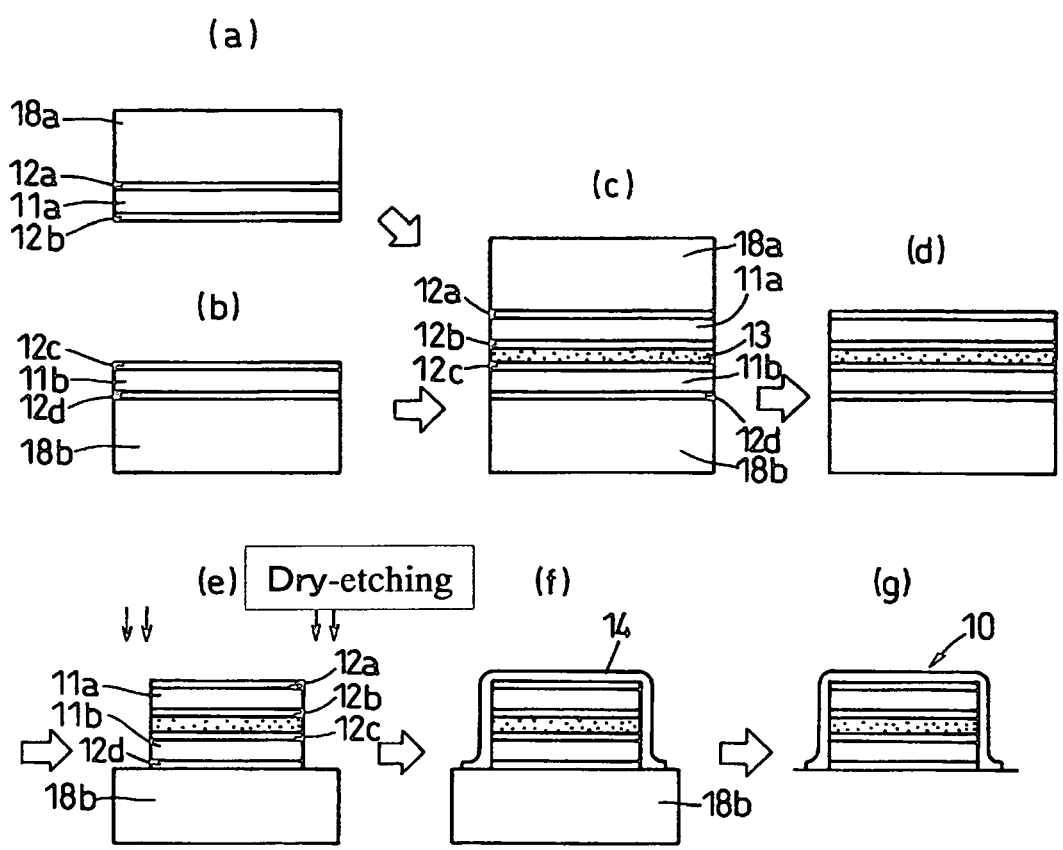
FIGS. 11(a) to (g) are enlarged cross-sectional schematic views showing procedures for double layering thin film piezoelectric actuator elements formed on a single crystal MgO substrate in accordance with an exemplary embodiment of the present invention.
Figure 12:
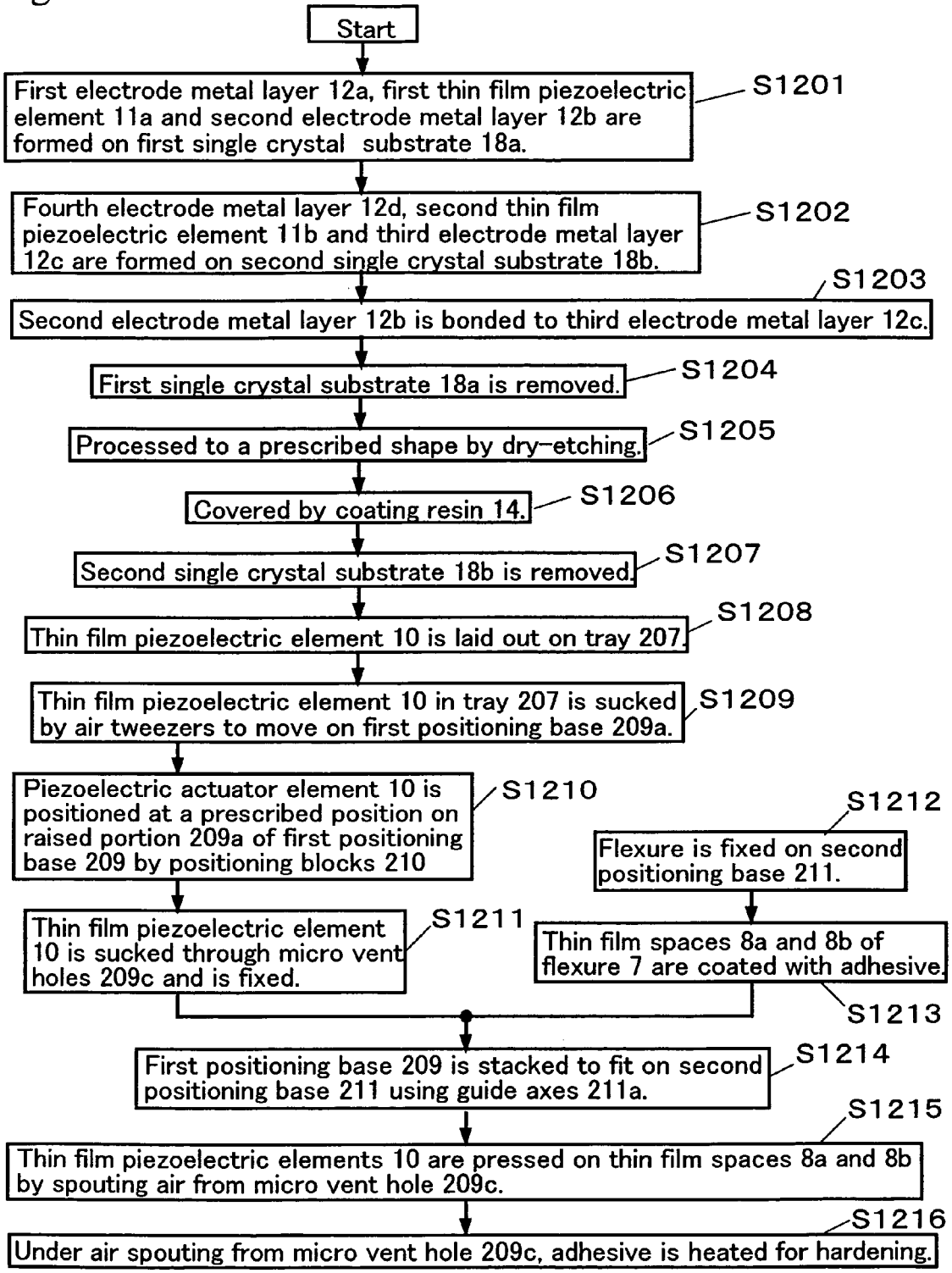
FIG. 12 is a flowchart showing a manufacturing method of a piezoelectric actuator element provided in a head suspension assembly in accordance with an exemplary embodiment of the present invention.

FIG. 11 illustrates procedures to make a double-layer structure for first thin film piezoelectric element 11a (second thin film piezoelectric element 11b) formed on single crystal MgO substrate 18. FIG. 12 is a flowchart to illustrate respective steps of manufacturing method for first thin film piezoelectric element 11a (second thin film piezoelectric element 11b). Procedures to make a double-layer structure for first thin film piezoelectric element 11a (second thin film piezoelectric element 11b) is described with reference to FIG. 11 and respective steps in FIG. 12.

First electrode metal layer 12a, first thin film piezoelectric element 11a and second electrode metal layer 12b are formed on first single crystal MgO substrate 18a as shown in FIG. 11(a). (Step S1201 of FIG. 12). Different from FIG. 10, FIG. 11 illustrates single crystal MgO substrate 18 positioned in upper side.

Next, fourth electrode metal layer 12d, second thin film piezoelectric element 11b and third electrode metal layer 12c are formed on second single crystal MgO substrate 18b as shown in FIG. 11(b). (Step S1202 of FIG. 12).

Subsequently, second electrode metal layer 12b is bonded to third electrode metal layer 12c with adhesive 13 as shown in FIG. 11(c). (Step S1203 of FIG. 12).

Then, first single crystal MgO substrate 18a that is one substrate of single crystal MgO substrates 18 is removed by etching as shown in FIG. 11(d). (Step S1204 of FIG. 12).

Then, first thin film piezoelectric element 11a and second thin film piezoelectric element 11b of the double-layer structure are processed to shape identical to piezoelectric actuator element 10 by dry-etching as shown in FIG. 11(e). (Step S1205 of FIG. 12).

Then, to protect piezoelectric actuator element 10 from corrosion, a surface of piezoelectric actuator element 10 formed on second single crystal MgO substrate 18b is covered by coating resin 14 as shown in FIG. 11(f). (Step S1206 of FIG. 12, see FIG. 5 also). The surface applied by spin-coating is then processed for patterning to form first coupling portion 14a and second coupling portion 14b (See FIG. 5).

Finally, remaining second single crystal MgO substrate 18b is removed by etching to complete piezoelectric actuator element 10 as shown in FIG. 11(g). (Step S1207 of FIG. 12, see FIG. 5 also).

In addition, a weld-layer formed from both electrode metals instead of using any resinous adhesive can replace adhesive layer 13 to bond second electrode metal layer 12b to third electrode metal layer 12c.

Figure 13:
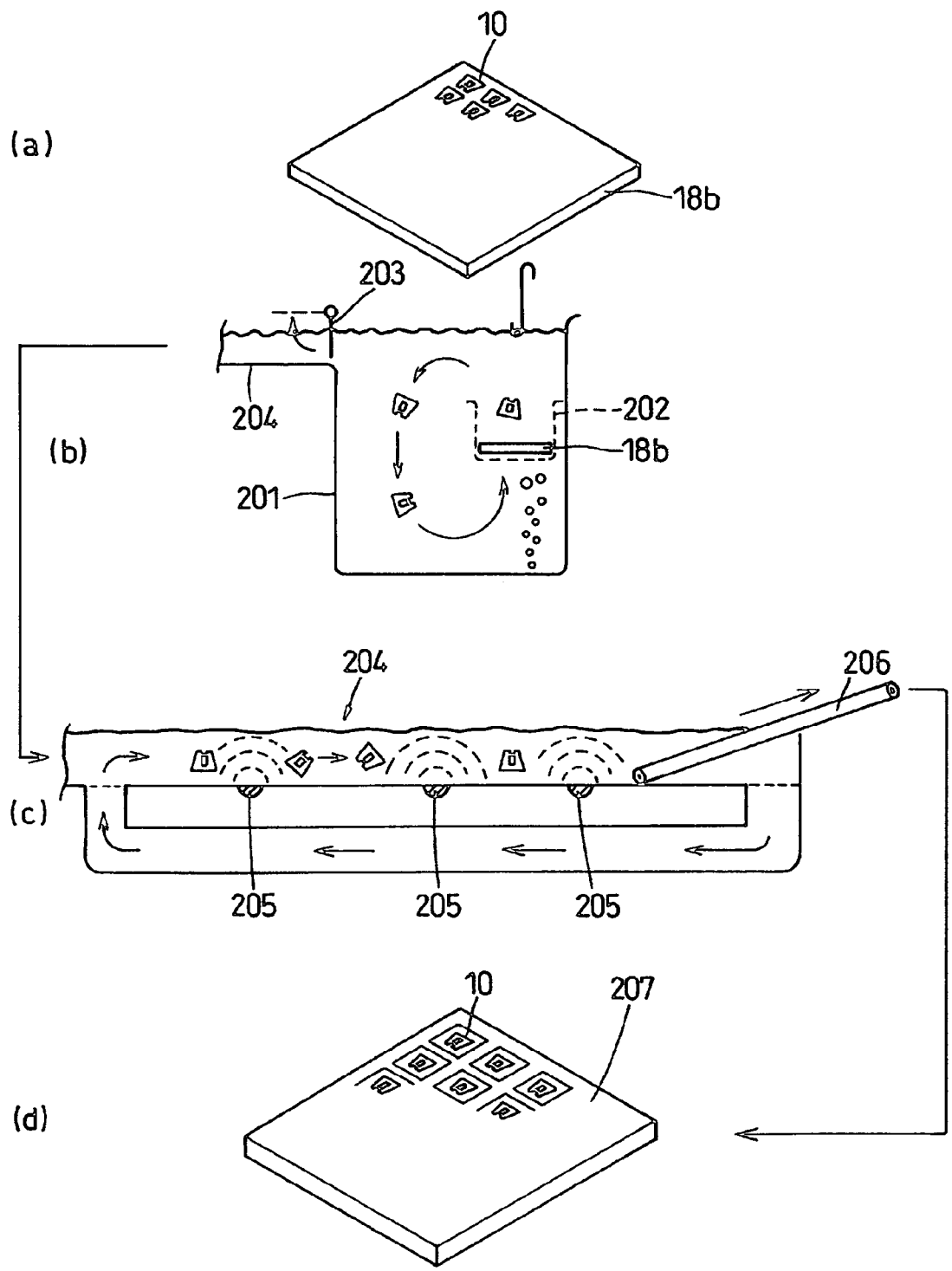
FIGS. 13(a) to (d) are schematic representations of a removing process of a second single crystal MgO substrate from a piezoelectric actuator element provided in a head suspension assembly in accordance with an exemplary embodiment of the present invention.

Next, a method to take out piezoelectric actuator element 10, formed on second single crystal MgO substrate 18b, in a form of thin-film is described. FIG. 13 illustrates a schematic representation of removing processes of second single crystal MgO substrate 18b. A plurality of piezoelectric actuator elements 10 are formed on a sheet of second single crystal MgO substrate 18b as shown in FIG. 13(a). Second single crystal MgO substrates 18b in net basket 202 are soaked in solution vessel 201 filled with a solvent to dissolve and remove second single crystal MgO substrate 18b. Piezoelectric actuator element 10 can be taken out in a form of thin-film by the procedures. The solvent in solution vessel 201 is forced to circulate to dissolve second single crystal MgO substrate 18b completely (S1207 in FIG. 12). Opening/closing door 203 provided at the top side of solution vessel 201 opens when second single crystal MgO substrate 18b is dissolved completely. Then, piezoelectric actuator elements 10 are transported along channel 204 having washing fluid to wash solvent. Piezoelectric actuator elements 10 are prevented from breaking during the transportation because first piezoelectric element unit 10a and second piezoelectric element unit 10b are coupled in two portions, in first coupling portion 14a and in second coupling portion 14b adjacent to the free end (see FIG. 5).

Channel 204 is equipped with ultrasonic generator 205 to stir piezoelectric actuator elements 10 by the ultrasonic vibration during the transportation in channel 204 as shown in FIG. 13(c). Piezoelectric actuator elements 10 are taken out of channel 204 by belt-conveyer 206 provided in a down stream of channel 204 and are dried. Being sucked by air tweezers (not shown), dried piezoelectric actuator elements 10 are moved to lay out on tray 207 as shown in FIG. 13(d). (Step S1208 of FIG. 12).

Figure 14:
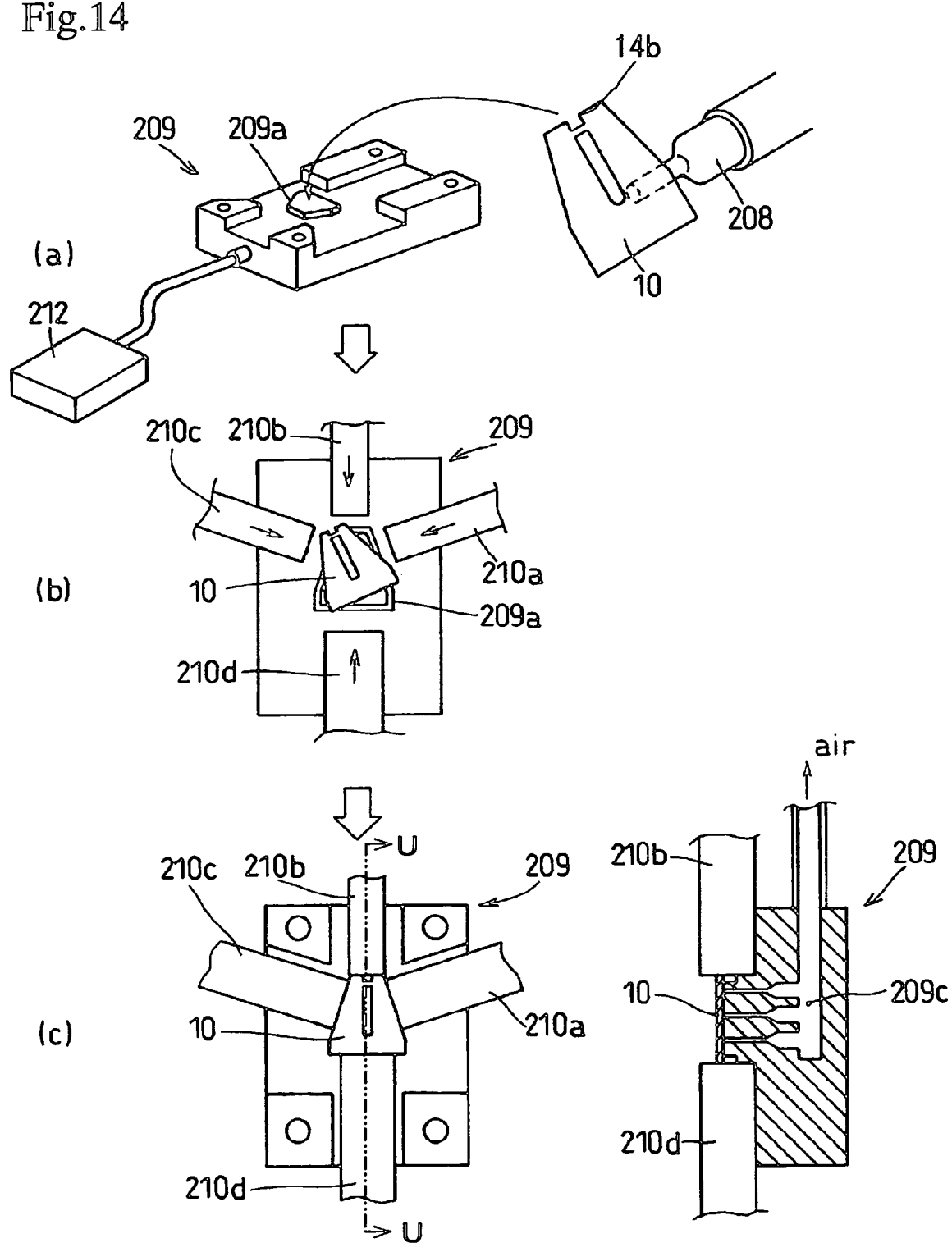
FIGS. 14(a) to (c) are schematic representations of a positioning process on a first positioning base of a piezoelectric actuator element provided in a head suspension assembly in accordance with an exemplary embodiment of the present invention.
Figure 15:
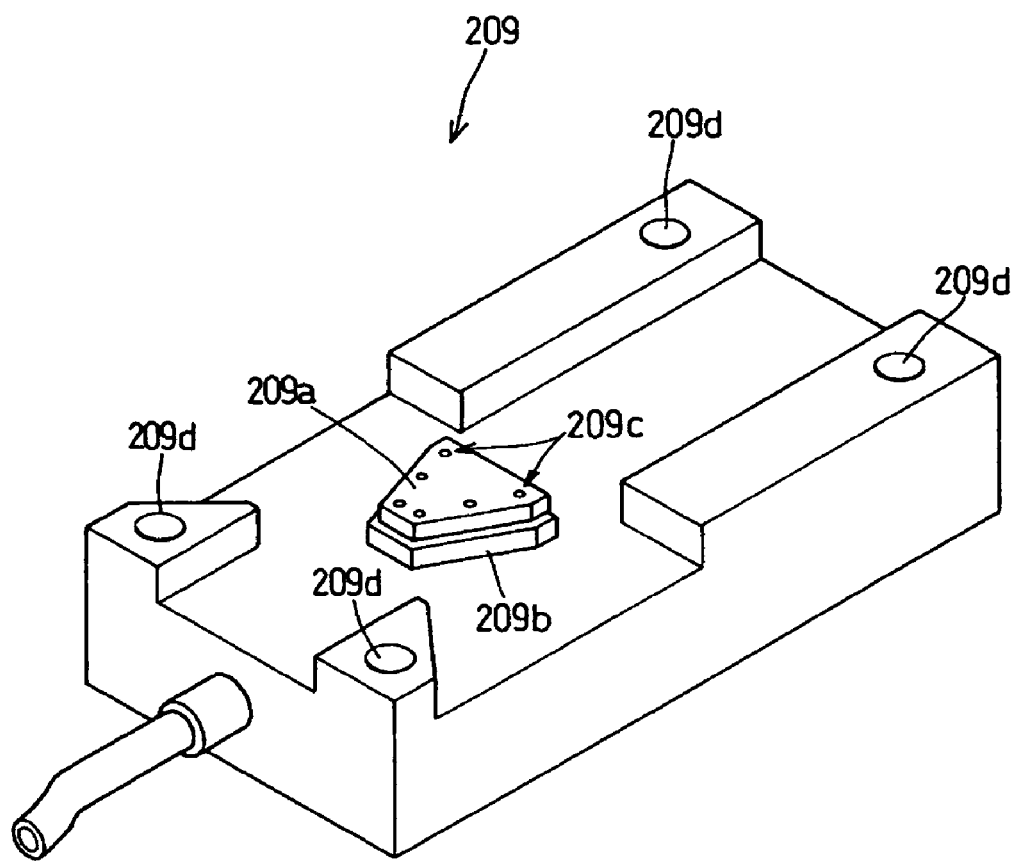
FIG. 15 is a perspective view of a first positioning base for the positioning of a piezoelectric actuator element provided in a head suspension assembly in accordance with an exemplary embodiment of the present invention.
Figure 16:
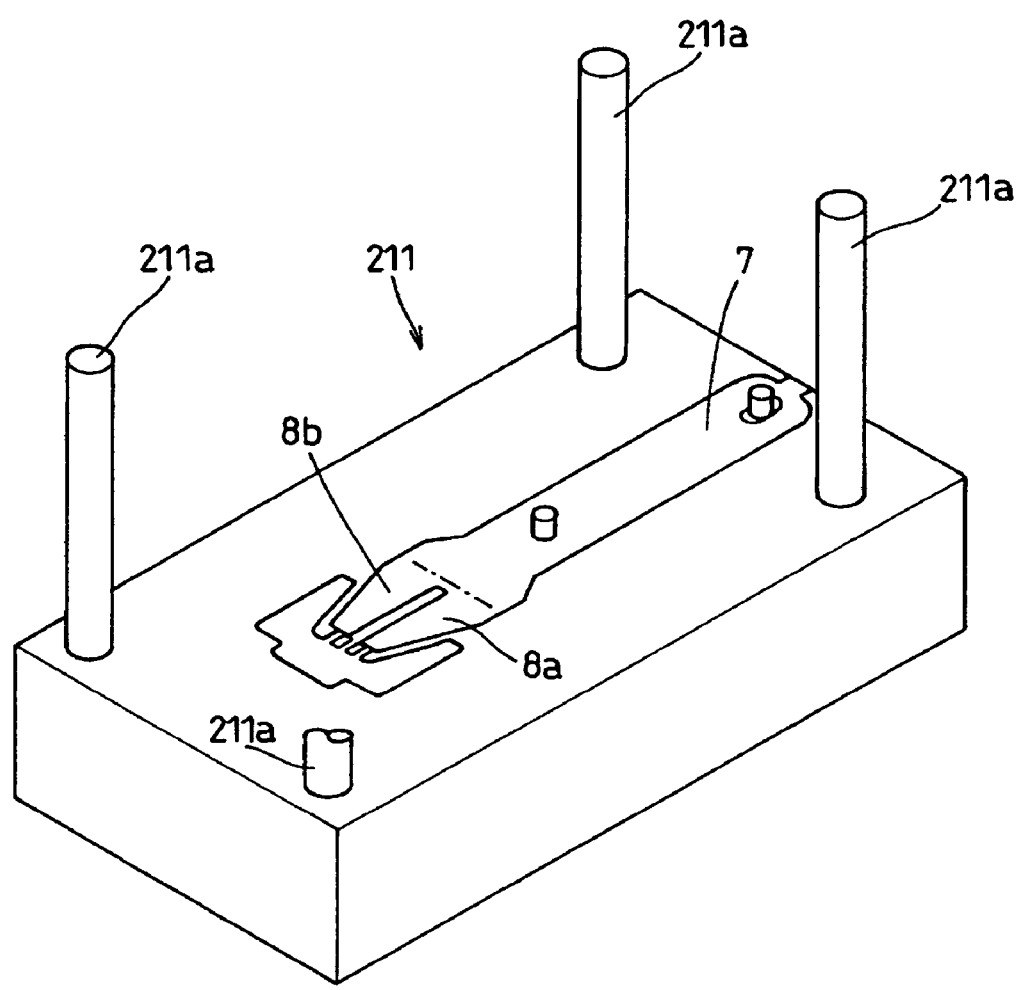
FIG. 16 is a perspective view of a second positioning base for the positioning of a piezoelectric actuator element provided in a head suspension assembly in accordance with an exemplary embodiment of the present invention.

Next, procedures to paste piezoelectric actuator elements 10 on thin film portions 8a and 8b precisely are described with reference to FIG. 12 and FIGS. 14 to 17. FIG. 14 shows a schematic representation of positioning procedures for piezoelectric actuator element 10 on first positioning base 209 and FIG. 15 shows a perspective view of positioning base 209. FIG. 16 shows a perspective view of positioning base 211 and FIG. 17 shows a schematic representation of procedures for stacking to fit second positioning base 211 on first positioning base 209.

The piezoelectric actuator disclosed in the exemplary embodiment of the present invention is manufactured in the following processes.

Firstly, piezoelectric actuator element 10 laid out on tray 207 is picked up by air tweezers to move on first positioning base 209. (Step S1209 in FIG. 12). First positioning base 209 has a raised thin film carrier 209a having a periphery identical to piezoelectric actuator element 10. Thin film carrier 209a to be mounted with piezoelectric actuator element 10 has a plane top surface whose periphery is a size smaller than piezoelectric actuator element 10 and, more preferably, has a figure similar to piezoelectric actuator element 10. (see FIG. 15). The shaping can prevent adhesives 13 from escaping on first positioning base 209.

Piezoelectric actuator element 10 moved on the top surface of thin film carrier 209a is not always positioned precisely on thin film carrier 209a as shown in FIG. 14(b). To correct loose positioning, therefore, periphery of piezoelectric actuator element 10 is pressed by positioning blocks 210a, 210b, 210c and 210d from four directions as shown in FIG. 14(c). Side outlines 209b of thin film carrier 209a, having outlines similar to piezoelectric actuator element 10, limits movement directions and positions of positioning blocks 210a, 210b, 210c and 210d. For the positioning of piezoelectric actuator element 10 at a prescribed position on first positioning base 209, respective positioning blocks 210a, 210b, 210c and 210d are pressed to touch side outlines 209b of thin film carrier 209a. (Step S1210 in FIG. 12).

A plurality of micro vent holes 209c to suck or to spout air are provided on the top surface of thin film carrier 209a as shown in sectional view taken along the line U—U in FIG. 14(c) shown in right hand side of the drawing. Piezoelectric actuator element 10 positioned on the top surface of thin film carrier 209a is sucked by air pump 212 through micro vent holes 209c and is fixed on thin film carrier 209a. (Step S1211 in FIG. 12).

On the other hand, flexure 7 is fixed on second positioning base 211 as shown in FIG. 16. (Step S 1212 in FIG. 12). In this condition, thin film portions 8a and 8b of flexure 7 are coated with adhesive 13. (Step S1213 in FIG. 12).

Subsequently, first positioning base 209 with piezoelectric actuator element 10 being sucked to as shown in FIG. 17 is fitted to second positioning base 211 fixed with flexure 7. Guide axes 211a provided in second positioning base 211 are fitted through guide holes 209d provided in first positioning base 209 so that first positioning base 209 and second positioning base 211 are positioned precisely each other and are stacked. (Step S1214 in FIG. 12).

First positioning base 209 and second positioning base 211 are so designed to create gap M of a few μm between flexure 7 and piezoelectric actuator element 10.

When first positioning base 209 and second positioning base 211 are stacked for piezoelectric actuator element 10 to face flexure 7, air is spouted from micro vent hole 209c of thin film carrier 209a as shown in FIG. 17(b). (Step S1215 in FIG. 12). The processing can bond piezoelectric actuator element 10 to thin film element portions 8a and 8b of flexure 7 reliably. During heating for hardening of adhesive 13, air spout from micro vent hole 209c of thin film carrier 209a is applied. (Step S1216 in FIG. 12).

Next, movement of head suspension assembly 100 of a disk drive provided with the piezoelectric actuator element 10 manufactured in the aforementioned processes is described with reference to FIGS. 18 to 20.

Figure 18:
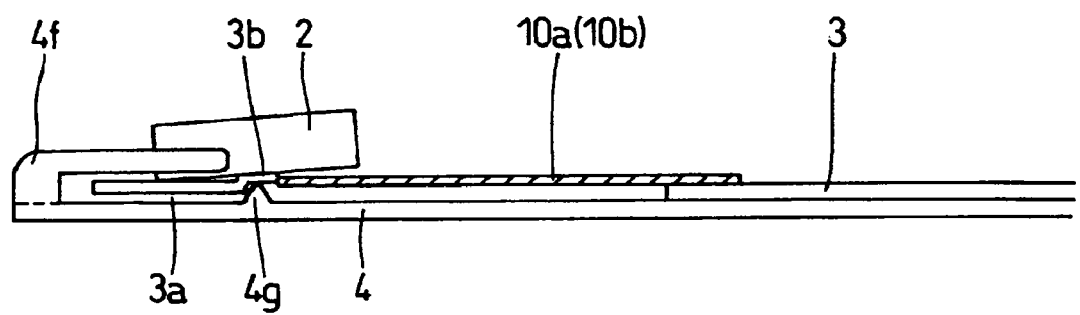
FIG. 18 is a partial side view of a head suspension assembly in accordance with an exemplary embodiment of the present invention.

FIG. 18 illustrates a side view of head suspension assembly 100 and FIG. 19 illustrates a schematic sectional view for the movement of piezoelectric actuator element 10 and a schematic view for the applied voltage specification. FIG. 20 shows a pattern diagram to describe movements of head suspension assembly 100.

Driver wiring 9c for piezoelectric actuator element 10 is grounded as shown in FIG. 19(a).

Driver wirings 9a and 9b are supplied with driving voltage to drive first thin film piezoelectric element 11a and second thin film piezoelectric element 11b respectively as shown in FIGS. 19(b) and (c). These driving voltages are in opposite phase each other relative to the bias voltage $V_0$ as a center.

Upon driving voltage being applied, first thin film piezoelectric element 11a and second thin film piezoelectric element 11b contract in the direction indicated by arrow B as shown in FIG. 19(a). Because voltage is applied for first thin film piezoelectric element 11a and second thin film piezoelectric element 11b in the polarization direction indicated by arrow P, first thin film piezoelectric element 11a and second thin film piezoelectric element 11b may not lose properties owing to polarization turn over. And when applied voltage is low enough not to cause polarization turn over, either plus or minus voltage can be applied on thin film piezoelectric element driver wiring 9a and 9b without any damage in properties.

Figure 20:
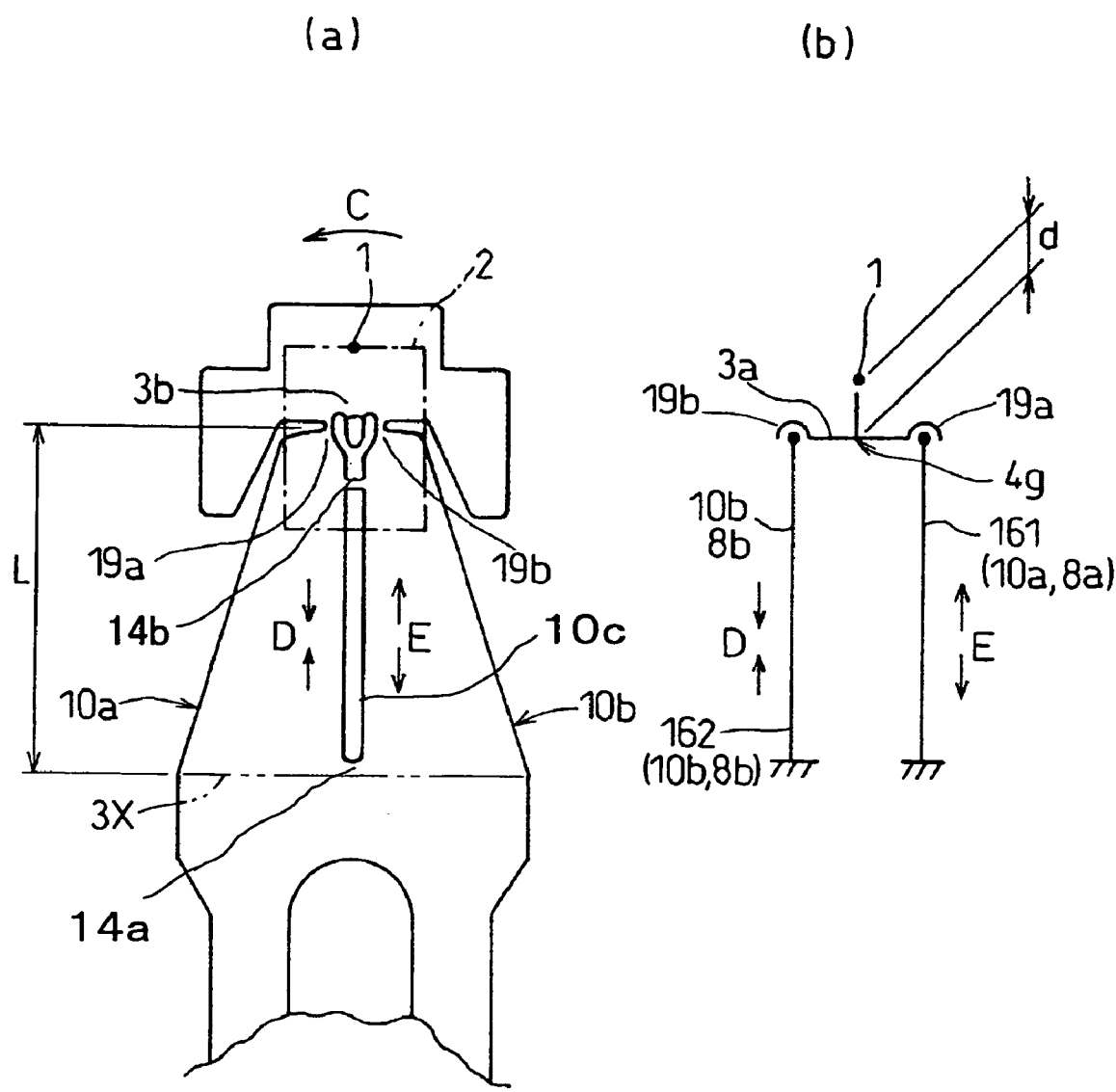
FIG. 20(a) is a schematic plan view to describe movements of a head suspension assembly in accordance with an exemplary embodiment of the present invention.
FIG. 20(b) is a pattern diagram to describe movements of a head suspension assembly in accordance with an exemplary embodiment of the present invention.
Figure 21:
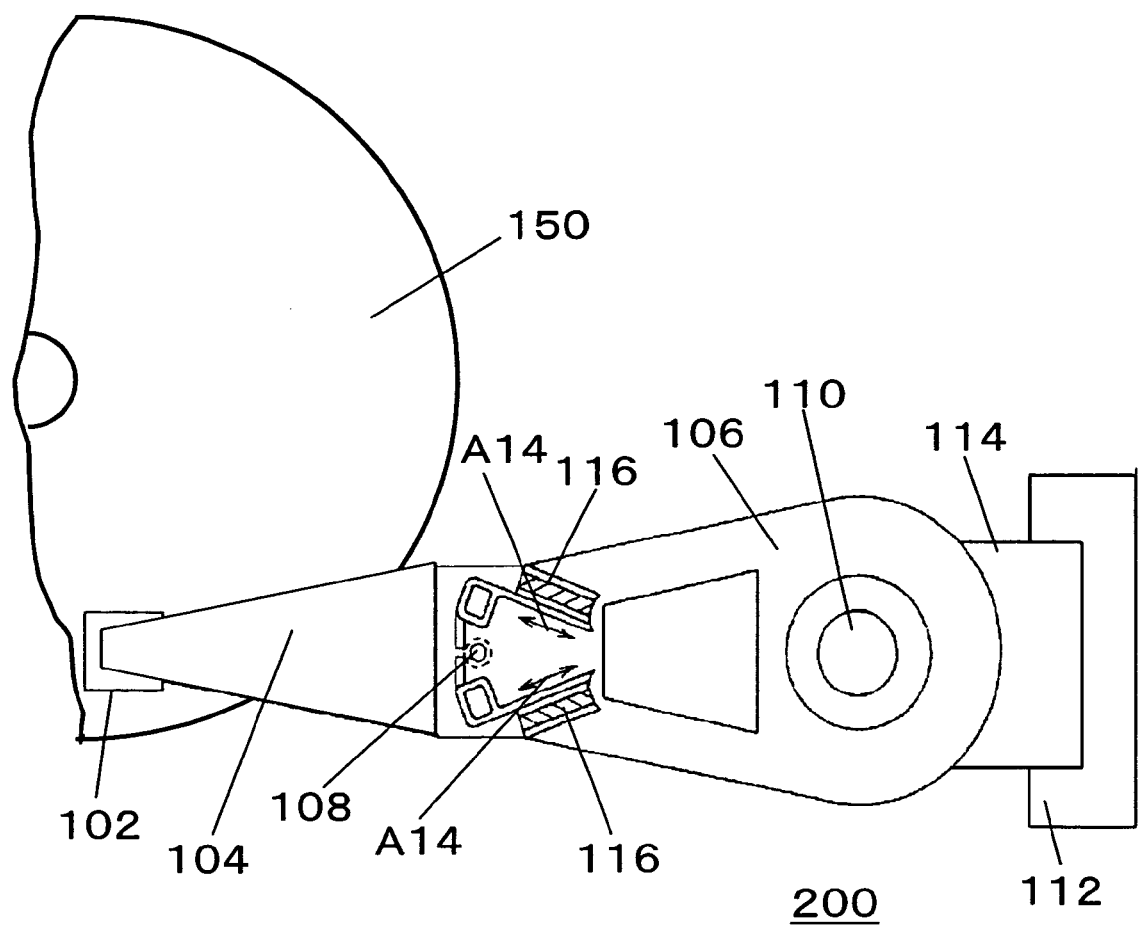
FIG. 21 is a plan view showing an example of a configuration of a head suspension assembly used in a typical conventional disk unit

FIG. 20 illustrates a pivotal movement of slider 2 when second piezoelectric element unit 10b expands while first piezoelectric element unit 10a contracts. When second piezoelectric element unit 10b expands in the direction indicated by arrow E and first piezoelectric element unit 10a contracts in the direction indicated by arrow D, slider 2 and slider holder 3a move pivotally in the direction indicated by arrow C, with boss 4g, pressed to touch projection 3b, acting as a rotational center. Consequently, magnetic head 1 mounted on slider 2 moves across the width of track provided concentrically on the disk. Therefore, magnetic head 1 not correctly positioned on tracks can be moved to the target tracks, resulting an "on-track property" with a high accuracy.

First piezoelectric element unit 10a and second piezoelectric element unit 10b are coupled using second coupling portion 14b formed from a flexible coating resin 14. The configuration does not hamper displacements of piezoelectric actuator element 10. Moreover, slit 10c formed between first coupling portion 14a and second coupling portion 14b contributes to enhance a flexibility of coupling portions.

Widths of hinge portions 19a and 19b have minimum dimensions for disposing respective wirings 6a, 6b, 6c and 6d as shown in FIG. 14, that are narrow enough not to be influenced by load owing to elastic deformation of the hinge portions resulting in reliable pivotal movements of slider holder 3a.

Plate spring 4e, shown in FIG. 2, of load beam 4 (or suspension arm) applies a load of the order of 20 mN to 30 mN on slider 2. Upon pivotal movements of slider holder 3a, the load functions for boss 4g and slider holder 3a. Therefore, a frictional force determined by a friction factor between slider holder 3a and boss 4g affects slider holder 3a.

The frictional force prevents projection 3b of slider holder 3a and boss 4g from occurring out-of-alignment.

FIG. 20(b) is a pattern diagram of the configuration in FIG. 20(a). Coupling portion 14b is omitted in FIG. 20(b) because coupling portion 14b has no relation to the fundamental movements of the actuator.

First beam 161 composed of thin film space 8a and first piezoelectric element unit 10a, and second beam 162 composed of thin film space 8b and second piezoelectric element unit 10b are coupled to slider holder 3a, pivotally fixed to boss 4g, freely in pivotal movement. Magnetic head 1 is mounted on slider holder 3a at a distance of "d" from boss 4g.

Flexible structure of hinge portions 19a and 19b for rolling as well as pitching directions enables slider 2 to have nice "flying" characteristics above the disk surface. Upon contraction of first beam 161 in the D direction and extension of second beam 162 in the E direction respectively, slider holder 3a moves pivotally to transport magnetic head 1 in the normal direction to the track.

Additionally, the head actuator described above can be applied in a head positioning device of head suspension assembly used in recording/reproducing apparatus of desk drive and other magnetic disk apparatuses.

In a more detailed description, the disk drive comprises: (a) a disk (or data recording medium); (b) a disk driving means to rotate the disk for instance a spindle motor or the like; (c) a slider equipped with a head for reading data from or writing data to the disk; and (d) a head suspension assembly having a head positioning device to move the slider radially on the desk to target tracks precisely.

Additionally, the head suspension assembly consists of (a) a load beam (or suspension arm) having a slider on its distal end; (b) a carriage (or base arm) that is rotatably mounted to an axis secured in a chassis (or housing) of the disk drive, wherein the carriage is moved pivotally by a driving means such as a voice coil motor disposed opposite to the disk or the like to move the slider equipped with a head radially on the desk to a target track; and (c) a head actuator provided between the carriage and the load beam.

Upon applying control signal, the head actuator can create the slider mounted at the distal end of the load beam a fine displacement for positioning at target tracks on the disk with a high accuracy.

As mentioned above, the piezoelectric actuator used in the exemplary embodiment of the present invention has a structure that the first thin film piezoelectric element unit and the second thin film piezoelectric element unit are coupled at two portions, one in the end of flexure and the other on the opposite side to the above near the ends of respective first and second thin film piezoelectric element units, using a resinous adhesive or the like. The configuration enables one to apply the thin film elements on the flexure precisely without any breakage. Moreover, the configuration does not need any voltage adjuster or the like to drive the piezoelectric elements, and enables for the magnetic head to move in a fine displacement on the desk to target tracks. Therefore, the invention disclosed can provide an excellent disk drive equipped with the head suspension assembly capable of positioning a magnetic head to target tracks on the disk with high accuracy.

What is claimed is:

1. A disk drive comprising:
   (a) a disk;
   (b) a voice coil motor to rotate said disk;
   (c) a slider including a magnetic head to record data to and/or reproduce data from said disk;
   (d) a load beam to suspend said slider in one end;
   (e) a carriage; and
   (f) a head actuator provided between said carriage and one disk side end of said load beam;
   wherein said head actuator has a first piezoelectric element unit, second piezoelectric element unit and coupling portions, and said first piezoelectric element unit is arranged approximately parallel to said second piezoelectric element unit, and said coupling portions couple said first piezoelectric element unit and said second piezoelectric element unit.

2. The disk drive according to claim 1, wherein said coupling portions are positioned relative to one another so as to form a slit between said first piezoelectric element unit and said second piezoelectric element unit, and said first piezoelectric element unit and said second piezoelectric element unit are coupled by said coupling portions at least in one end of said first piezoelectric element unit and said second piezoelectric element unit, and opposing surfaces of said first piezoelectric element unit and said second piezoelectric element unit.

3. The disk device according to claim 1, wherein said coupling portions are composed of a flexible resin.

4. The disk device according to claim 1, wherein said coupling portions are made from a material identical to a material utilized for a protective layer to cover said first piezoelectric element unit and said second piezoelectric element unit.

5. The disk device according to claim 4, wherein said protective layer is composed of a resin.

6. The disk drive according to claim 1, wherein said first piezoelectric element unit and said second piezoelectric element unit are formed from thin films.

7. The disk drive according to claim 6, wherein said first piezoelectric element unit and said second piezoelectric element unit form a multilayered structure using two thin film piezoelectric element bodies, each consisting of a thin film piezoelectric element covered by a metal coating layer on top and bottom surfaces thereof, with an adhesive disposed between the thin film piezoelectric element bodies.

8. The disk drive according to claim 7, wherein said adhesive layer is composed of resinous adhesives.

9. The disk drive according to claim 7, wherein said adhesive layer is a weld coupling formed by both electrode metal layers being welded together.

* * * * *